US005362355A

United States Patent [19]

Twele

[11] Patent Number: 5,362,355

[45] Date of Patent: Nov. 8, 1994

[54] APPARATUS FOR APPLYING LABELS TO CONTAINERS

[75] Inventor: Terrance J. Twele, Sparks, Nev.

[73] Assignee: Owens-Illinois Plastic Products Inc., Toledo, Ohio

[21] Appl. No.: 41,806

[22] Filed: Apr. 1, 1993

Related U.S. Application Data

[63] Continuation of Ser. No. 812,386, Dec. 23, 1991, abandoned.

[51] Int. Cl.[5] .......... B65G 29/00

[52] U.S. Cl. .......... 156/542; 156/541; 156/567; 156/568; 156/DIG. 12; 156/DIG. 27; 198/379

[58] Field of Search .......... 156/446, 540, 542, 566, 156/567, 568, DIG. 12, DIG. 13, DIG. 26, DIG. 27, 541; 198/379, 394

[56] References Cited

U.S. PATENT DOCUMENTS

| | | | |
|---|---|---|---|
| 3,126,309 | 3/1964 | Manas et al. | 156/DIG. 27 X |
| 3,527,334 | 9/1970 | Wideman | 198/379 |
| 3,934,714 | 1/1976 | Matsumoto | 198/379 |
| 4,019,935 | 4/1977 | Harvey | 156/64 |
| 4,143,754 | 3/1979 | Eldred | 156/DIG. 26 X |
| 4,175,993 | 11/1992 | Robertson | 156/234 |
| 4,280,612 | 7/1981 | Nagano | 198/379 |
| 4,381,211 | 4/1983 | Nechay | 156/361 |
| 4,467,909 | 8/1984 | Jörss | 156/567 X |
| 4,487,650 | 12/1984 | Mohn et al. | 156/567 |
| 4,721,544 | 1/1988 | Zodrow et al. | 156/456 |
| 4,806,197 | 2/1989 | Harvey | 156/DIG. 26 X |
| 4,950,350 | 8/1990 | Zodrow et al. | 156/DIG. 26 X |
| 5,004,517 | 4/1991 | Orlandi | 156/567 |
| 5,137,136 | 8/1992 | Humele | 198/379 |
| 5,224,586 | 7/1993 | Naka et al. | 198/803.11 |

*Primary Examiner*—David A. Simmons
*Assistant Examiner*—J. Sells

[57] ABSTRACT

An apparatus for applying labels to containers wherein the web on which the labels are provided is moved from a feed reel over a metering mechanism into position for transfer to containers on a turret. The web is thereafter stored on a reel. The turret has a plurality of circumferentially spaced replaceable container holders which can be readily removed to accommodate containers having a wide range of label panel radii.

12 Claims, 4 Drawing Sheets

APPARATUS FOR APPLYING LABELS TO CONTAINERS

This is a continuation of copending application Ser. No. 07/812,386 filed on Dec. 23, 1991, abandoned.

This invention relates to applying labels to articles such as bottles or containers and particularly to applying labels to containers by removal of labels from a web upon which they are stored and application of the labels to the containers.

BACKGROUND AND SUMMARY OF THE INVENTION

In the application of labels by what is known as transfer labeling, it is customary to position labels on a web and thereafter transfer the labels to the article to be labeled. In one type of such labeling, heat sensitive labels are used which must be heated and applied to the articles. In another type, pressure sensitive labels are used which must be removed from the web and applied to the article. Heretofore, it has been common to have separate apparatus for handling each of these types of labels.

In such apparatus, it is common to utilize a turret table and associated turret spiders which designed with one or more pockets or recesses for receiving a specifically shaped bottle or container. In order to accommodate bottles having different configurations such as panel areas for receiving labels with different radii, it is necessary to replace the bottle support portion of the turret.

Among the objectives of the present invention are to provide an apparatus wherein the turret is provided with replaceable bottle or container holders; which container holders can be readily replaced; wherein the container holders can be adapted to various configurations of bottles or containers; and wherein substantial savings in cost are achieved.

In accordance with the invention, the apparatus for applying labels to containers wherein the web on which the labels are provided is moved from a feed reel over a metering mechanism into position for transfer to containers on a turret. The web is thereafter stored on a reel. The turret has a plurality of circumferentially spaced replaceable container holders which can be readily removed to accommodate containers having a wide range of label panel radii.

DESCRIPTION

In accordance with the invention, the basic apparatus for applying heat sensitive labels is utilized for applying pressure sensitive labels wherein the apparatus can be readily changed to apply heat sensitive labels or pressure sensitive labels from a web along which the labels are positioned. In one mode for applying heat sensitive labels, the web is moved from a feed reel over a shuttle mechanism, a metering mechanism and adjacent a preheater and to a platen where successive labels are applied directly from the web to successive non-rotating oval containers on a turret and thereafter the web is stored on a take-up reel. In a second mode, the preheater and platen are removed, the shuttle mechanism is bypassed and a peel bar assembly is positioned in place of the platen and the web with the labels thereon is moved about the peel bar assembly to peel a label from the web and apply the pressure sensitive label to a article on the turret and the web is thereafter redirected to the take-up reel.

Figure 1:
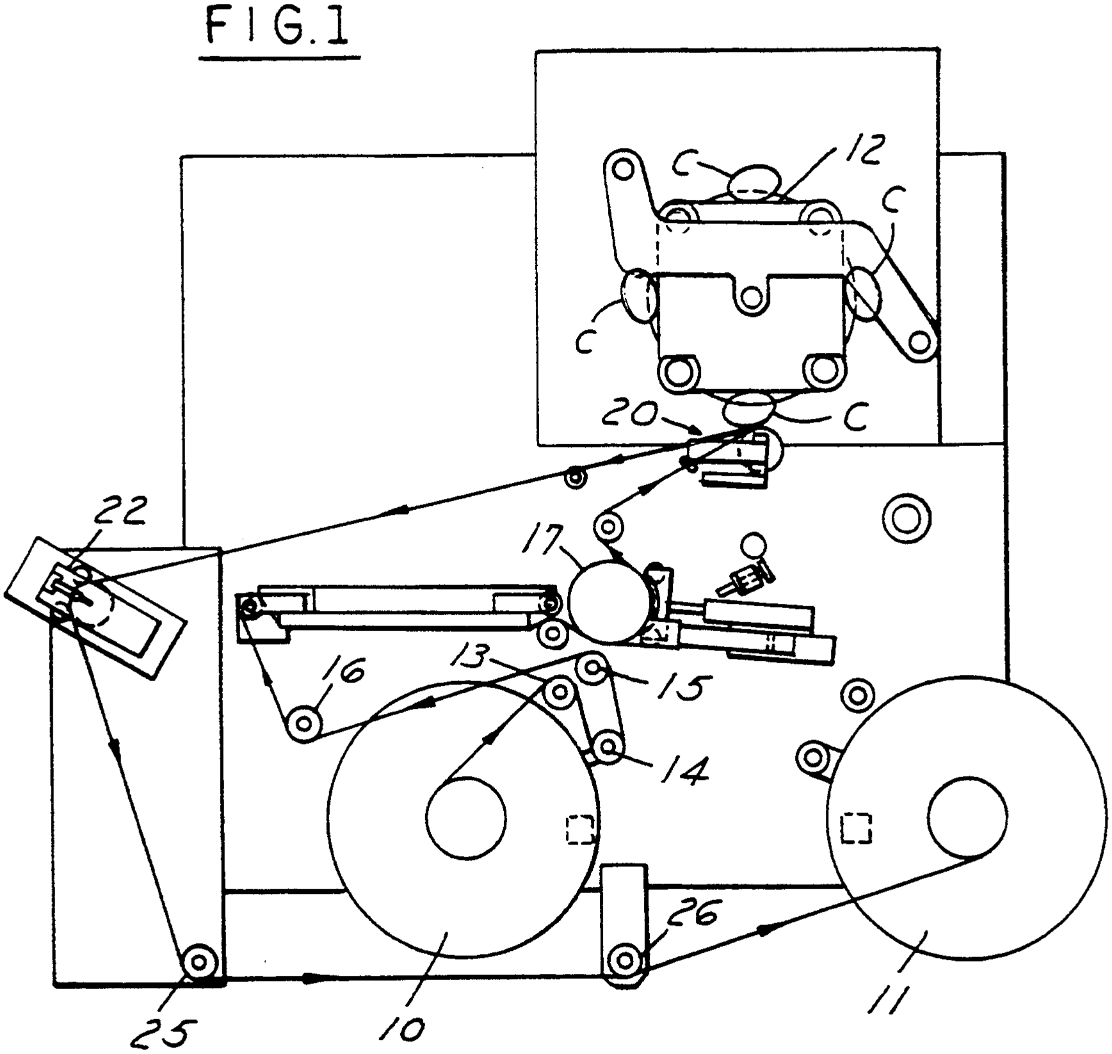
FIG. 1 is a schematic diagram of a labeling applying apparatus for applying labels to articles such as bottles or containers.
Figure 8:
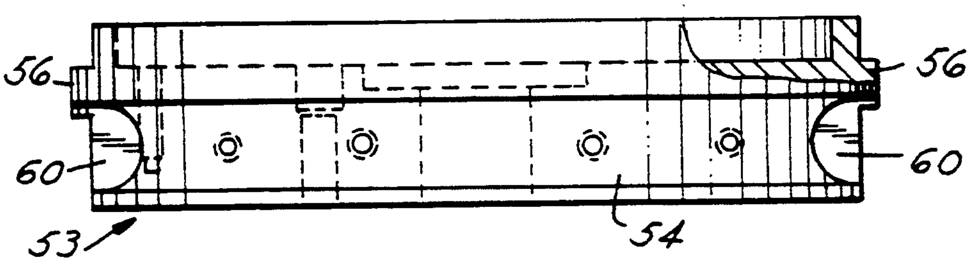
FIG. 8 is a part sectional view of the replaceable holder base.
Figure 2:
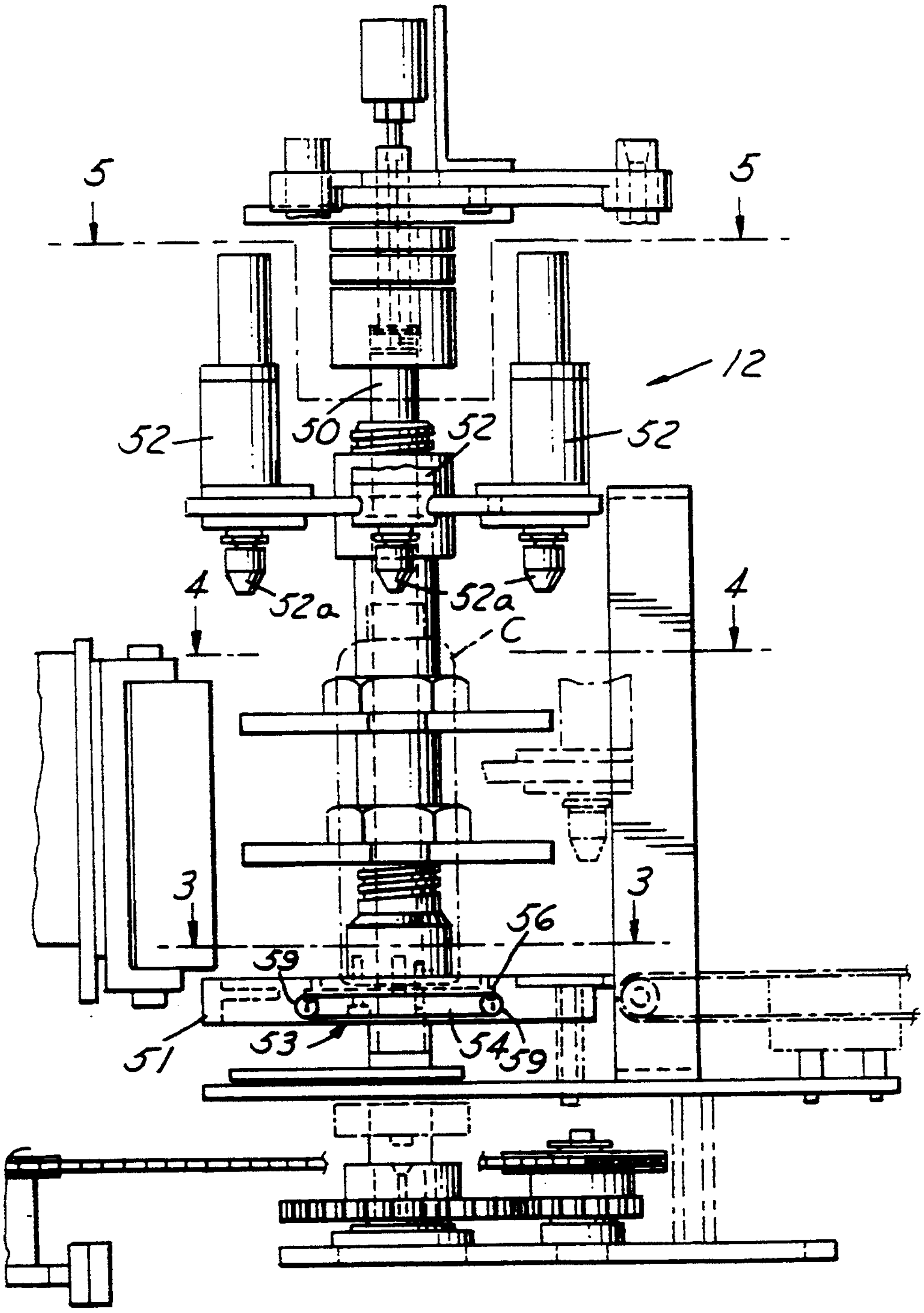
FIG. 2 is a fragmentary elevational view of a turret embodying the invention as utilized in the apparatus.

Referring to FIG. 1, a conventional apparatus for applying labels comprises a frame F which supports a feed reel 10 for a web having labels thereon. The web passes around an idler roller 13, around an idler roller 14. The web thereafter passes thereafter over a metering mechanism 17 against an article C which comprises one of a plurality of articles such as containers on a turret 12. The web then passes over idler rollers 25, 26 and is wound on a take-up reel 11. The supply of the web by the feed reel 10 and the take-up of the web by the take-up reel 11.

A peel bar assembly 20 is provided. In addition, a driven web take-up mechanism 22 is provided in advance of the take-up reel 11. Take-up mechanism 22 comprises a power driven resilient roll to pull the web toward the take-up reel 11. Rolls are yieldingly urged against the drum of the metering mechanism 17 to hold the web against the drum without slipping. Thus, the web bearing the pressure sensitive labels is trained about the peel bar assembly 20 where the change in direction of the web strips each label so that it can be applied to the article C on the turret 12. The web after leaving the peel bar assembly 20 passes over the take-up drive mechanism 22 and then to the take-up reel 11.

Referring to FIGS. 2–8 in accordance with the invention, the turret 12 for supporting the containers comprises a central shaft 50 on which a turret support plate 51 is positioned. The turret further includes axially moveable nose plugs 52*a* for engaging the open ends of the containers which are moved by cylinders 52 mounted on a cylinder support plate.

In accordance with the invention, the turret support plate 51 comprises a plurality of circumferentially spaced replaceable bottle or container holders 53. Each bottle holder 53 is generally trapezoidal. Each bottle holder 53 includes a metal body 54 and a plastic insert 55 formed in situ in a cavity of the body 53, the insert 55 being formed with a recess 55*a* to conform with the base of the bottle 55 or container. Each bottle holder 53 includes radially extending ribs 56 along its side that engage complementary channels or grooves 57 in the recess of the plate 51 so that each bottle holder 53 is inserted by engagement of the ribs 56 with the grooves 57 and moving the bottle holder 53 radially inwardly. Each bottle holder 53 is retained by cap screws 58 that are threaded into the turret plate 12*a* and have heads 59 that engage recesses 60 in the bottle holder 53.

Figure 3:
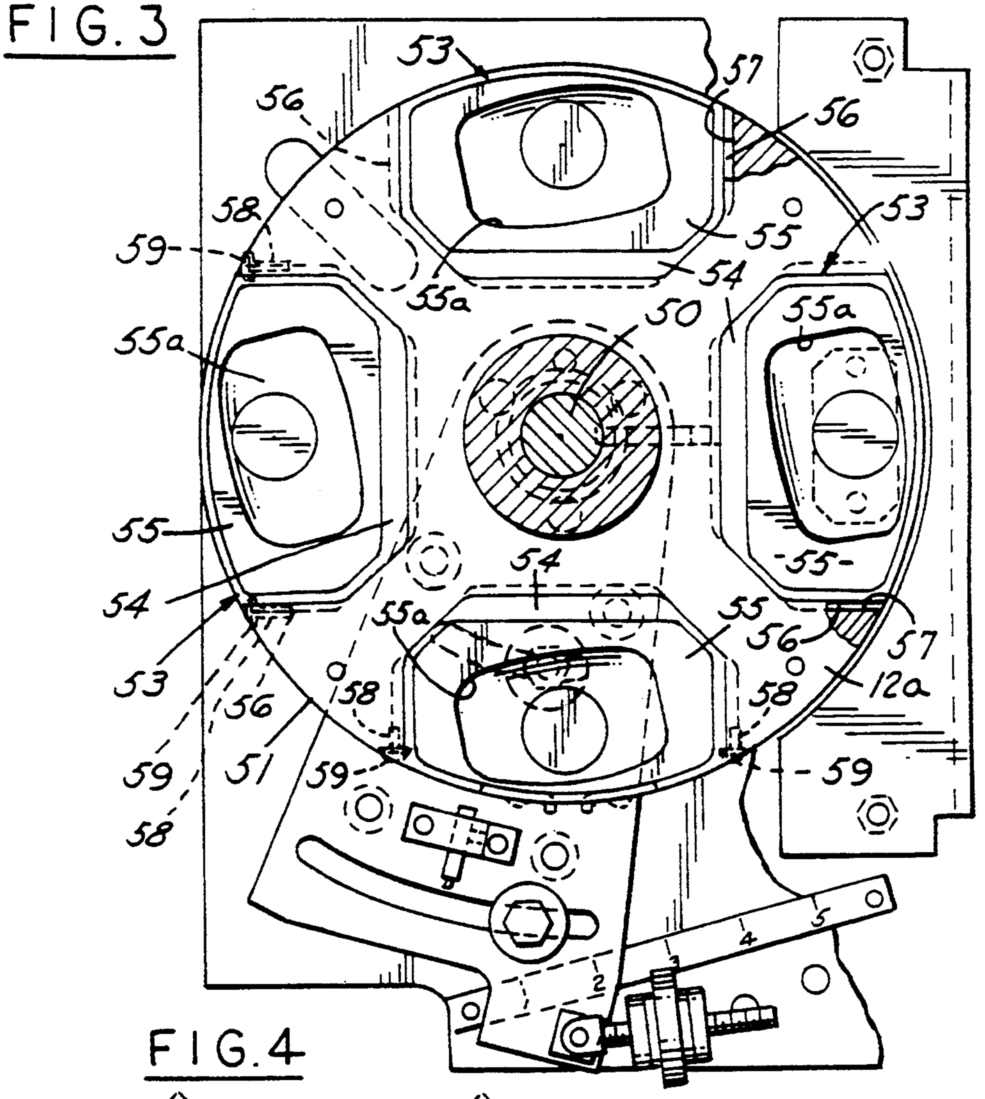
FIG. 3 is a sectional view taken along the line 3—3 in FIG. 2.
Figure 4:
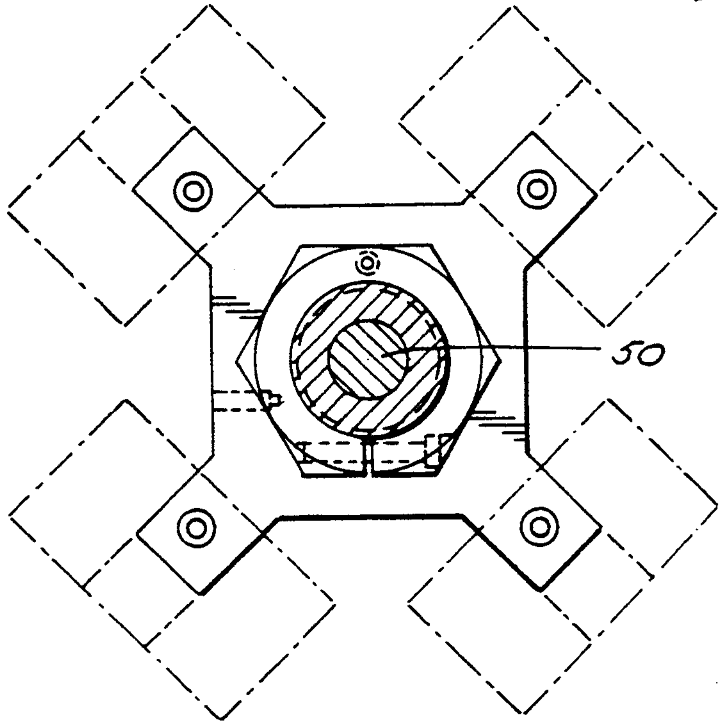
FIG. 4 is a sectional view taken along the line 4—4 in FIG. 2.
Figure 5:
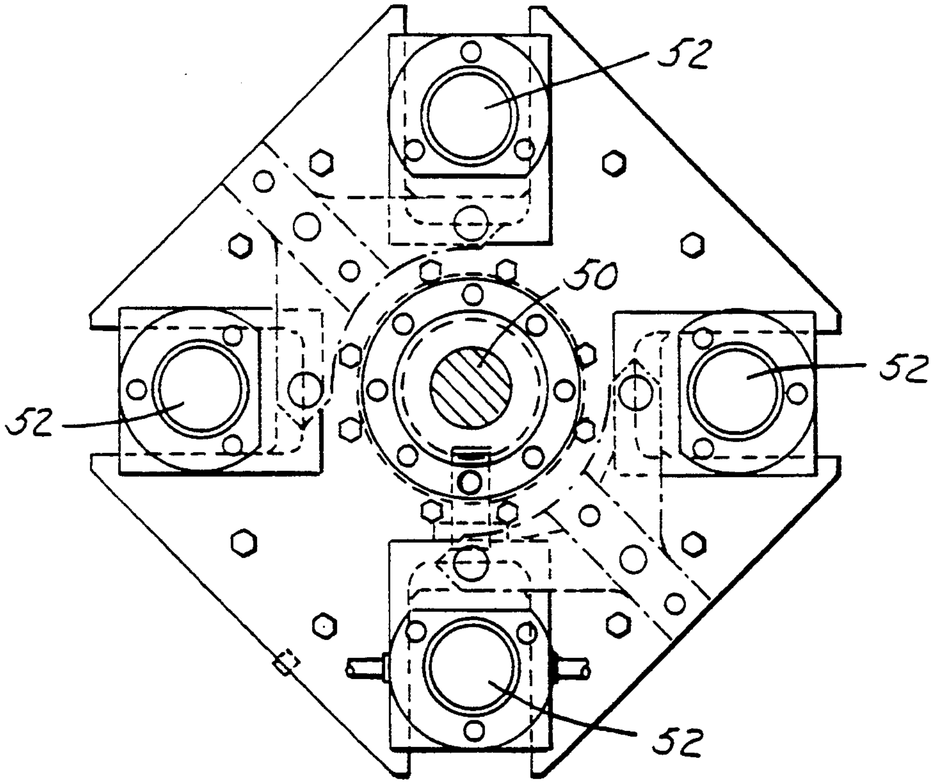
FIG. 5 is a sectional view taken along the line 5—5 in FIG. 2.
Figure 6:
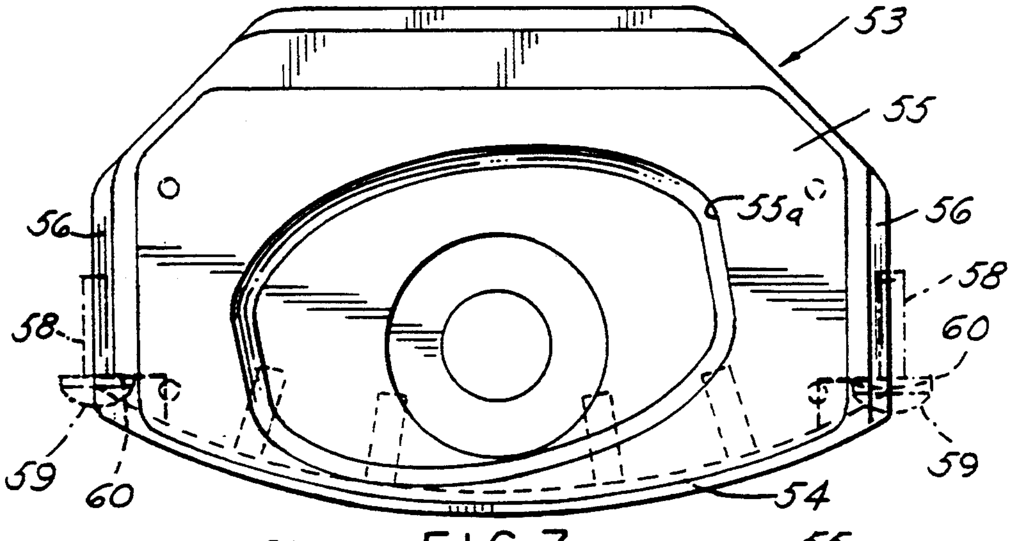
FIG. 6 is a plan view of a replaceable holder.
Figure 7:
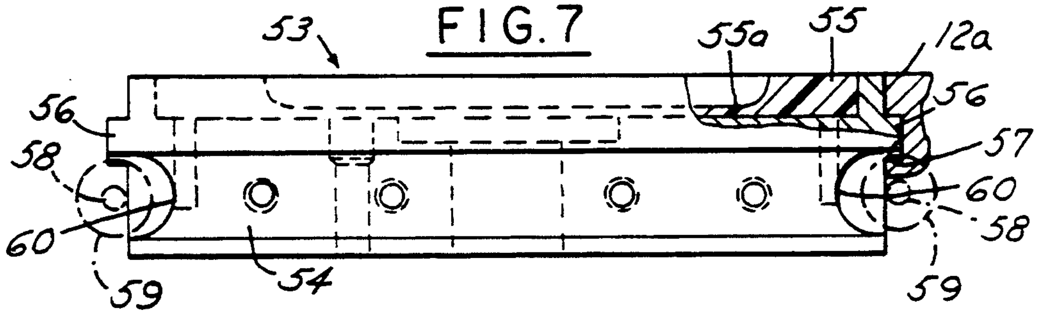
FIG. 7 is a part sectional elevational view of a replaceable holder.

As shown in FIG. 3, the bottle base holding recesses are preferably, in the case of generally oval containers, formed so that the panel area P is at an angle to the periphery of the turret plate in order to facilitate transfer of the pressure sensitive labels to the articles. In other words, the long axis of the recess is at an angle to a circumference defined by the axis of the recess.

The master turret design permits the use of inexpensive bottle holders to be made and set into the turret. Formerly, the turret was completely built with the bottle holders as an integral part of the turret. The use of a master turret and bottle holders will reduce the time needed to obtain assembled turrets for new bottles to a period of one week. The bottle holders could also be made in the blow molding plant instead of at a machine shop. The benefit of this is that the time from when an acceptable bottle is made to when the turret can be assembled to label the bottle is 1 week vs. 8–10 weeks.

To permit use of a standard master turret as a machine part instead of a tooling part, the turret would then accept specialized parts pertinent to the specific bottle. The parts would then be placed into the turret to permit pressure sensitive labeling of the bottle.

I claim:

1. An apparatus for applying labels to containers wherein the web on which the labels are provided is moved from a feed reel over a metering mechanism into position for transfer to containers on a turret that is rotatable about a vertical axis, and the web is thereafter stored on a reel, the improvement wherein the turret comprises a plurality of circumferentially spaced replaceable container holders which can be readily removed to accommodate bottles or containers having a wide range of bottle radii, each holder having a recess for receiving the base of a container, each said holder comprising a body and a plastic insert permanently secured to said body, said plastic insert being formed with said recess for receiving the base of the container, and means for guiding said holders and locking said holders in fixed position on said turret.

2. The apparatus set forth in claim 1 wherein said means for guiding said holders comprises a plurality of circumferentially spaced radially opening peripheral recesses in said turret, each said recess having generally radial side walls, and interengaging means between the sides of each holder and said recess side walls.

3. The apparatus set forth in claim 2 wherein said interengaging means comprises a rib along each side of said holder and a groove on each side of said recess side walls.

4. The apparatus set forth in claim 3 wherein said means for locking each said holder on said turret comprises a fastener threaded radially into said turret adjacent to each said peripheral recess and a head on said fastener overlying a portion of the holder and thereby radially capturing said holder in the said peripheral recess.

5. The apparatus set forth in claim 1 wherein the recess in each said holder is elongated.

6. The apparatus set forth in claim 5 wherein the long axis of each said recess is at an angle.

7. An apparatus for applying labels to containers wherein the web on which the labels are provided is moved from a feed reel over a metering mechanism into position for transfer to containers on a turret that is rotatable about a vertical axis, and the web is thereafter stored on a reel, the improvement wherein the turret comprises a plurality of circumferentially spaced replaceable container holders which can be readily removed to accommodate bottles or containers having a wide range of bottle radii, each holder having a recess for receiving the base of a container and means for guiding said holders and locking said holders on said turret, said means for guiding said holders comprising a plurality of circumferentially spaced radially opening non-circular peripheral recesses in said turret into which said holders are individually radially received, each said recess having generally radial side walls, and interengaging means between the sides of each holder and the said side walls of the corresponding non-circular peripheral recess for removably receiving the said holder from a direction radial to said axis while preventing rotation of each said holder with respect to said recess and turret.

8. The apparatus set forth in claim 7 wherein each said holder comprises a body and a plastic insert molded in situ in said body, said plastic insert being formed with said recess for receiving the base of the container.

9. The apparatus set forth in claim 7 wherein said interengaging means comprises a rib along each side of said holder and a groove on each side of said recess side walls.

10. The apparatus set forth in claim 9 wherein said means for locking each said carrier on said turret comprises a fastener threaded radially into said turret adjacent to each said peripheral recess and a head on said fastener overlying a portion of the holder and thereby radially capturing said holder in the said peripheral recess.

11. The apparatus set forth in any of claims 7–8 or 9–10 wherein the recess in each said holder is elongated.

12. The apparatus set forth in claim 11 wherein the long axis of each said recess is at an angle.

* * * * *